United States Patent
Matsumoto

(10) Patent No.: US 7,580,082 B2
(45) Date of Patent: Aug. 25, 2009

(54) DIGITAL BROADCASTING RECEIVER

(75) Inventor: Kiyoshi Matsumoto, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 1109 days.

(21) Appl. No.: 10/682,721

(22) Filed: Oct. 10, 2003

(65) Prior Publication Data

US 2004/0075776 A1  Apr. 22, 2004

(30) Foreign Application Priority Data

Oct. 18, 2002  (JP)  ............... 2002-304146

(51) Int. Cl.
 *H04N 5/44* (2006.01)
 *H04N 5/50* (2006.01)
(52) U.S. Cl. ............... 348/731; 348/734
(58) Field of Classification Search ............... 348/734, 348/725, 731, 906, 563, 569–570; 725/26–31, 725/38–40, 131, 139, 151; *H04N 5/44, 5/50*
See application file for complete search history.

(56) References Cited

U.S. PATENT DOCUMENTS

| | | | |
|---|---|---|---|
| 5,465,113 A | | 11/1995 | Gilboy |
| 5,548,345 A | * | 8/1996 | Brian et al. .............. 725/27 |
| 5,969,748 A | * | 10/1999 | Casement et al. .......... 725/27 |
| 7,149,309 B1 | * | 12/2006 | Silver .................... 380/229 |
| 7,210,158 B1 | * | 4/2007 | Forler .................... 725/31 |
| 7,313,803 B1 | * | 12/2007 | Lynch .................... 725/25 |

FOREIGN PATENT DOCUMENTS

| | | |
|---|---|---|
| CN | 1115947 | 1/1996 |
| JP | 07-075082 | 3/1995 |
| JP | 08-140010 | 5/1996 |
| JP | 11-027639 A | 1/1999 |
| JP | 11-112903 * | 4/1999 |
| JP | 11-215460 A | 8/1999 |
| JP | 2000-215546 | 8/2000 |
| WO | WO 01/58158 | 8/2001 |

OTHER PUBLICATIONS

Japanese Office Action dated Feb. 7, 2009, Application No. 2002-304146.

* cited by examiner

*Primary Examiner*—Trang U Tran
(74) *Attorney, Agent, or Firm*—Westerman, Hattori, Daniels & Adrian, LLP.

(57) ABSTRACT

A digital broadcasting receiver judges whether or not a received program is a data broadcasting program. When the received program is the data broadcasting program, processing for judging a remote control signal from a remote control transmitter is performed as usual. When it is judged that the remote control signal is a remote control signal related to a key associated with channel selection, however, processing corresponding to the signal is not performed. That is, processing for judging whether or not the received program is the data broadcasting program to automatically nullify (lock) a channel change.

8 Claims, 4 Drawing Sheets

DIGITAL BROADCASTING RECEIVER

BACKGROUND OF THE INVENTION

Field of the Invention

The present invention relates to a digital broadcasting receiver that receives digital broadcasting.

A digital broadcasting receiver that receives digital broadcasting using a satellite or a terrestrial wave selects any of a plurality of broadcasting waves received through a dedicated antenna or a terrestrial wave antenna using a tuner, selects any of a plurality of channels included in the selected broadcasting wave using demultiplex processing, extracts a digital signal on the selected channel, and decodes the extracted digital signal, to output a video/audio signal.

In such digital broadcasting, data broadcasting is also realized, information such as weather forecast and news can be acquired, data broadcasting contents are further opened in a browser, and an interactive service can be utilized by accessing an enterpriser server through a modem. The interactive service makes it possible to apply for quiz and presents and purchase commodities, for example.

Meanwhile, in the above-mentioned interactive service, a user can achieve communication by entering a number or the like using a key in a remote control transmitter. When a channel selecting key is erroneously operated in entering the number, however, the transition from a state where data broadcasting is being received to another program occurs. There has been conventionally provided a channel lock key (a CH lock key) for preventing a channel on which a program being recorded is broadcast from being changed, for example. It is considered that the channel is locked during the receiving of data broadcasting by the operation. However, it is tiresome to operate the channel lock key every time data broadcasting is received. Further, a channel transition may occur by the user forgetting to perform the operation.

SUMMARY OF THE INVENTION

In view of the foregoing circumstances, an object of the present invention is to provide a digital broadcasting receiver capable of realizing channel locking without taking a user a lot of time and labor in receiving data broadcasting.

In order to solve the above-mentioned problem, in a digital broadcasting receiver so configured as to receive a digital broadcasting wave and acquire data for data broadcasting included therein to display a data broadcasting video on a screen as well as to make it possible to perform an indicating operation for the contents of the displayed data broadcasting video using a remote control transmitter, a digital broadcasting receiver according to the present invention is characterized by comprising judgment means for judging whether or not there occurs a state where a data broadcasting program is tuned in to; and means for nullifying, out of signals from the remote control transmitter, the receiving of the signal related to channel selection when it is judged that there occurs the state where the data broadcasting program is tuned in to.

In the above-mentioned configuration, in the state where the data broadcasting program is tuned in to, the receiving of the signal related to the channel selection out of the signals from the remote control transmitter is nullified. Even if a user erroneously operates a channel selecting key, therefore, no channel transition occurs.

The digital broadcasting receiver may be so configured that the nullification processing is released when the predetermined key provided in the remote control transmitter is operated. Further, it may be so configured that the nullification processing is automatically released when the data broadcasting program is terminated. Further, during the nullification processing, a representation that the nullification processing is being performed may be displayed on the screen.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
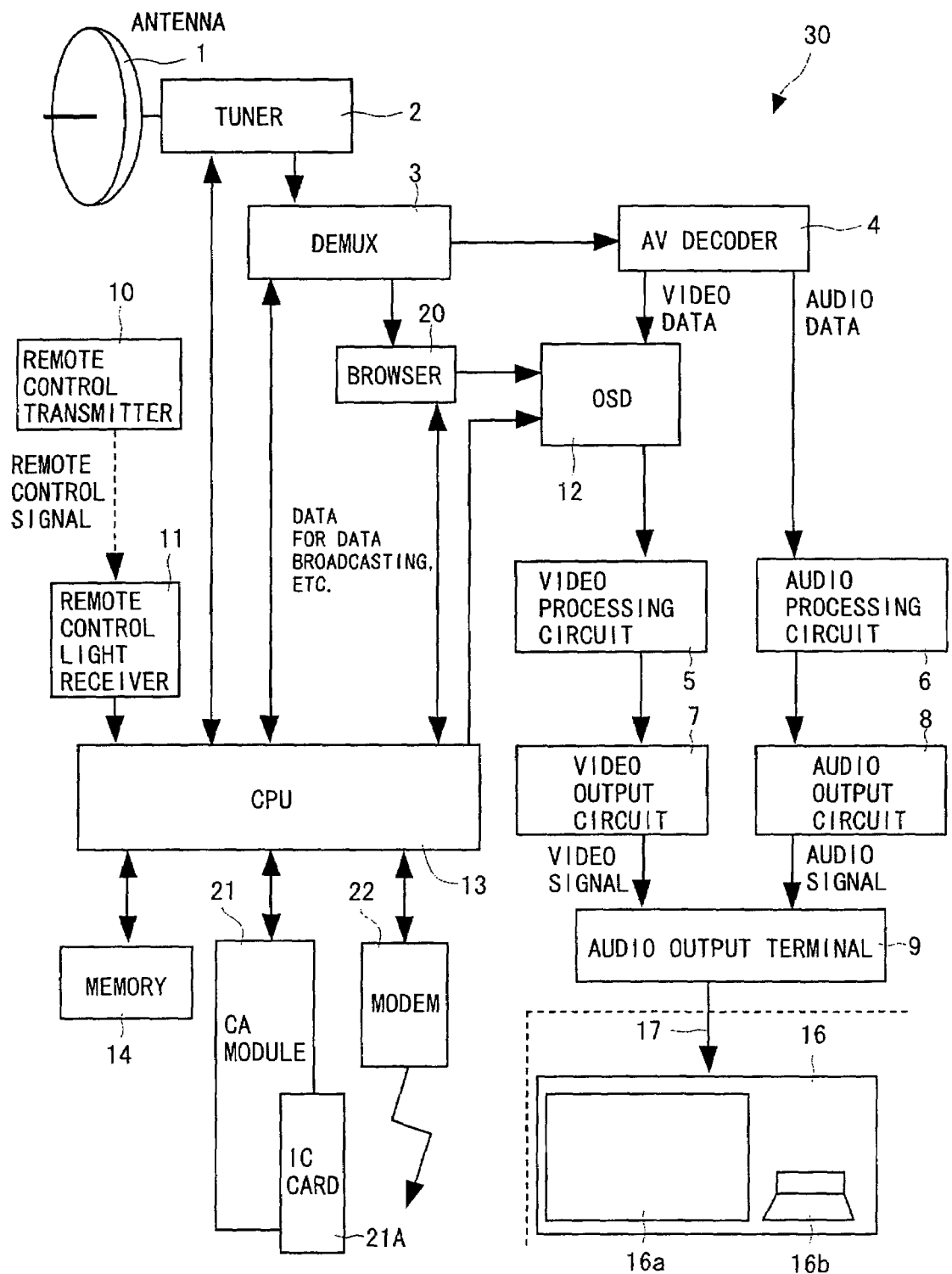
FIG. 1 is a block diagram showing a digital broadcasting receiver 30 according to the present embodiment.

An embodiment of the present invention will be described on the basis of FIGS. 1 to 5. Here, a case where a user views programs in satellite digital broadcasting is illustrated.

An antenna 1 is arranged in a predetermined direction outdoors, and receives a digital broadcasting signal fed from a satellite. The antenna 1 generally comprises a frequency converter, and feeds a received/frequency-converted signal to a tuner 2.

The tuner 2 extracts, out of high-frequency digital modulation signals including video/audio data, the signal having a particular frequency. That is, it performs processing for selecting one of a plurality of transponders in digital broadcasting. Further, the tuner 2 comprises a demodulation circuit, an inverse interleave circuit, an error correcting circuit, and so forth, thereby demodulating the selected digital modulation signal to output a transport stream.

A demultiplexer (DEMUX) 3 separates the transport stream into a video stream and an audio stream based on MPEG2 (Moving Picture Experts Group2), PSI/SI (Program Specific Information/Service Information), and so forth. The demultiplexer 3 feeds the video stream and the audio stream to an AV decoder 4, feeds to a CPU 13 program information (the name of a program, the time when the program begins, information related to the contents of the program, information related to the genre of the program, etc.) and the like included in the PSI/SI, and feeds data for data broadcasting to a browser (a BML browser in the present conditions) 20. It can be judged whether or not data broadcasting is being performed on the basis of information representing the type of service, for example. As described above, a plurality of channels are multiplexed on the transport stream. Processing for selecting any of the channels can be performed by extracting data indicating which packet ID in the transport stream is used to multiplex the arbitrary channel from the above-mentioned PSI/SI. The transport stream can be also selected on the basis of information in the PSI/SI.

The decoder 4 comprises a video decoder for decoding the video stream, and an audio decoder for decoding the audio stream. The video decoder decodes a coded signal which has been inputted, to find a quantization factor and a motion vector, thereby carrying out inverse DCT (Discrete Cosine Transformation), motion compensation control based on the motion vector, and the like. The audio decoder decodes a coded signal which has been inputted, to produce audio data. The video data is outputted to a video processing circuit 5 through an OSD (On-Screen Display) circuit 12, and the audio data is outputted to an audio processing circuit 6.

The video processing circuit 5 receives the video data which has passed through the OSD circuit 12 and subjects the received video data to D/A (Digital-to-Analog) conversion, and converts the video data into a composite video signal, for example. The audio processing circuit 6 receives the audio data outputted from the decoder 4 and subjects the received audio data to D/A (Digital-to-Analog) conversion, to generate an analog signal of a right (R) signal and an analog signal of a left (L) signal, for example.

The video output circuit 7 and the audio output circuit 8 are configured by comprising an output resistor, an amplifier, and so forth. An AV output terminal 9 is provided with an output unit (a set of a left/right audio output terminal or the like and a video output terminal or the like). A monitor 16 comprising a CRT (Cathode-Ray Tube) 16a and a speaker 16b is connected to the output unit by a video/audio code 17.

The OSD circuit 12 is a circuit for generating video data based on character information and color information which it is instructed to output from the browser 20 or the CPU 13. By the OSD circuit 12, display of EPG (Electronic Program Guide) based on program information, for example, can be performed.

Figure 2:
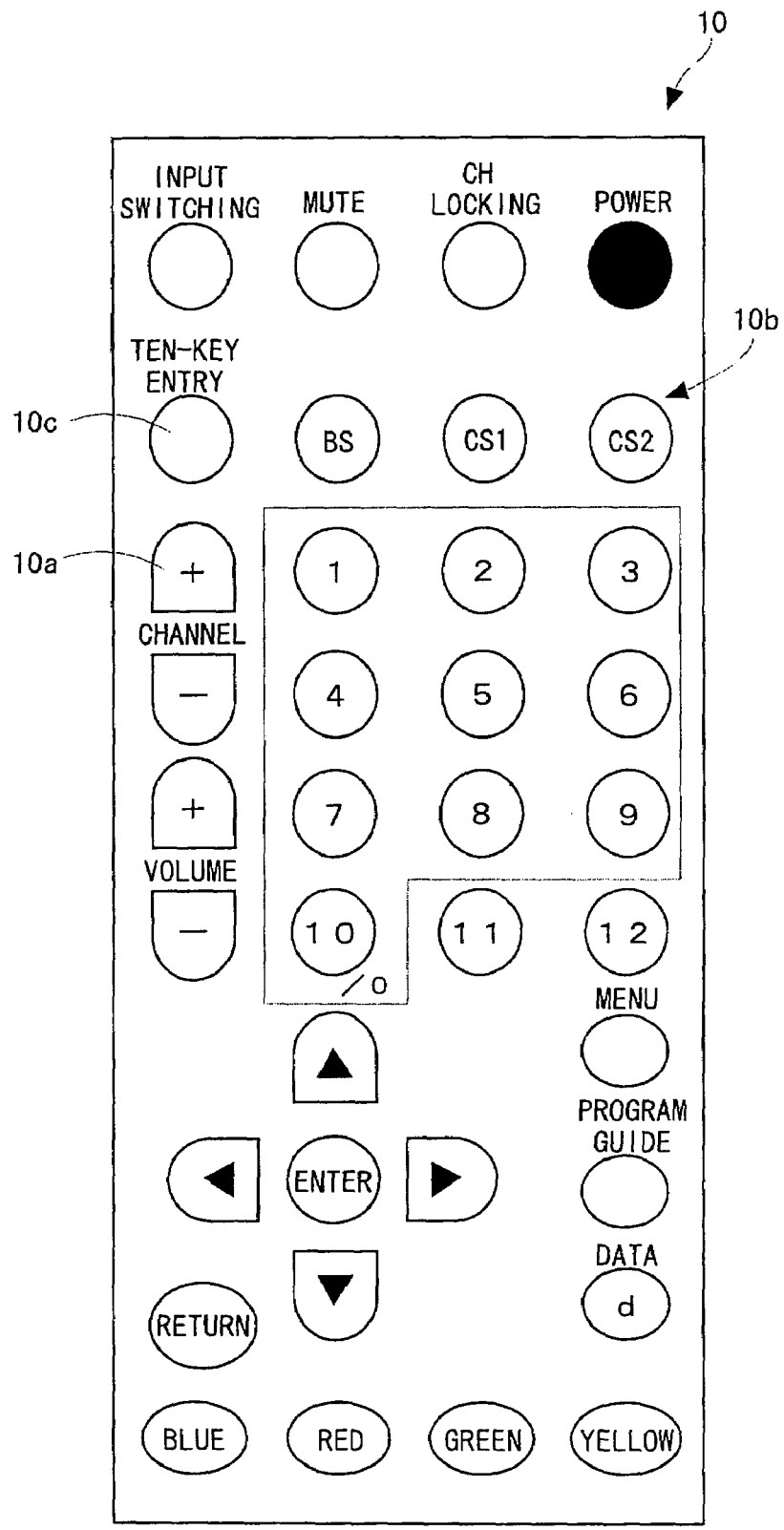
FIG. 2 is a plan view of a remote control transmitter.
Figure 3:
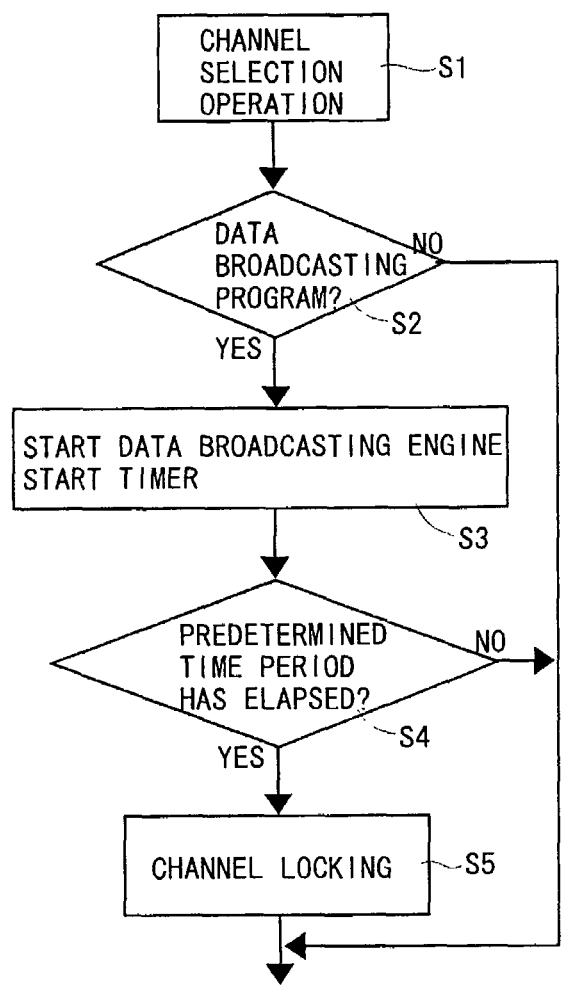
FIGS. 3 and 4 are flow charts showing the contents of processing.
Figure 4:
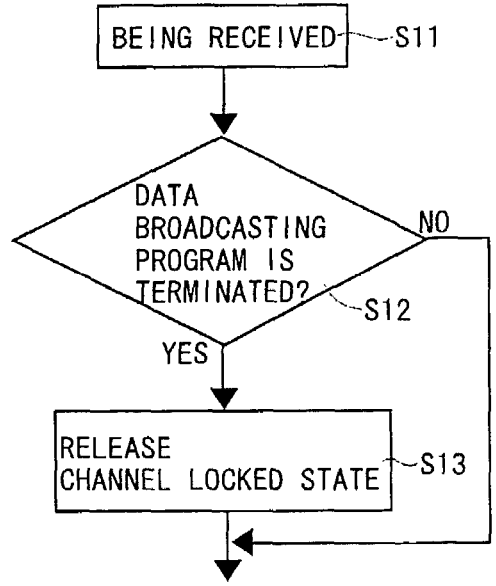
Figure 5:
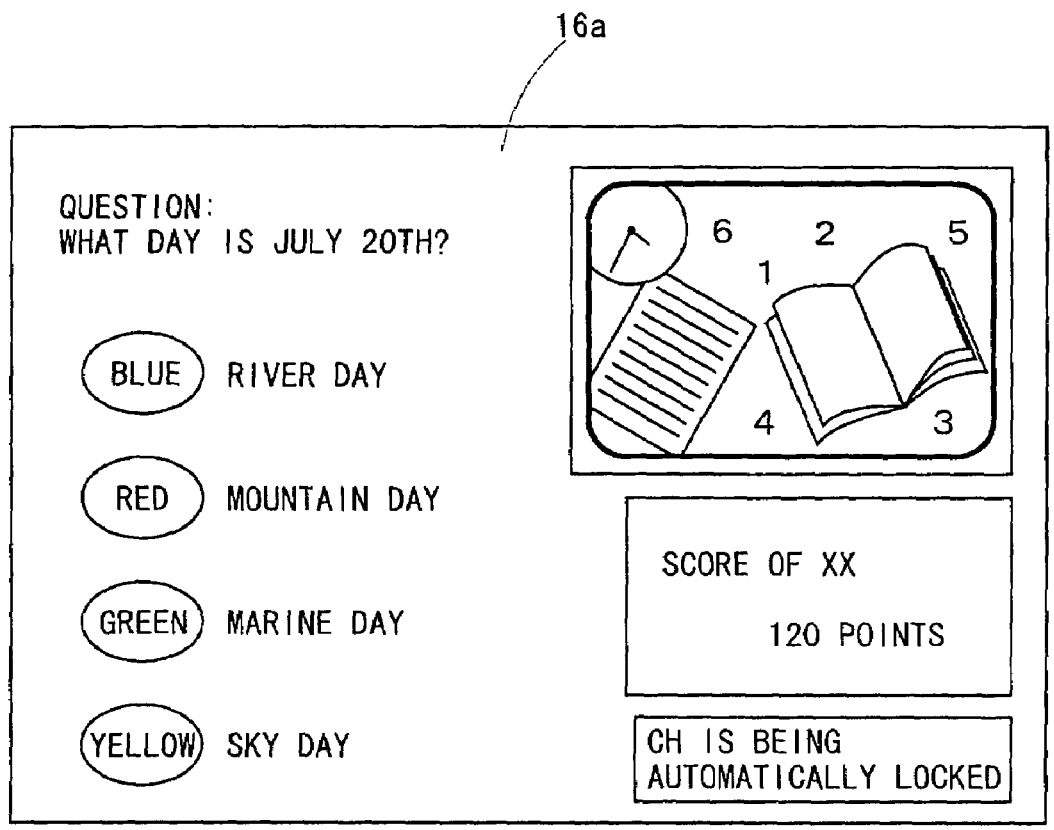
FIG. 5 is an illustration showing an example of a display screen of a data broadcasting program.

A remote control transmitter 10 comprises various types of keys, as shown in FIG. 2, and sends out various types of commands to a broadcasting receiver 30. When the key is operated, signal light (a remote control signal) meaning the command corresponding to the key is sent out of a light emitting unit (not shown). A remote control light receiver 11 receives the signal light, converts the received signal light into an electric signal, and feeds the electric signal to the CPU 13 In the present embodiment, when a "ten-key entry" key 10c in the remote control transmitter 10 is pressed, "1" to "10" of keys numbered "1" through "12" function as ten-keys "0" to "9". In the functioning state, a three-digit channel number can be entered.

A memory (a RAM, a flash memory, an EEPROM (Electrically Erasable and Programmable ROM), etc.) 14 stores EPG data (program information) or the like for displaying an EPG screen or the like.

A modem 22 is operated under the control of the CPU 13 in dial-up connection in transmitting viewing history information to a charging center and interactive service communication.

An IC card 21A stores in its built-in memory key information for making it possible to view PPV (Pay-Per-View) programs in pay-per-view broadcasting, viewing history information related to the PPV programs for which fees are to be respectively charged, and so forth. A CA (Conditional Access) module 21 performs writing processing and reading processing of various types of information between the CPU 13 and the IC card 21A.

The CPU 13 carries out overall control in the digital broadcasting receiver 30. However, the following control is carried out at the time of receiving data broadcasting particularly as control according to the present invention.

① Processing for judging a remote control signal from the remote control transmitter 10 is performed as usual. When it is judged that the remote control signal is a remote control signal related to a key associated with channel selection, processing corresponding to the signal is not performed. That is, processing for automatically nullifying (locking) a channel change is performed. Examples of the key associated with channel selection are a channel up-down key 10a and a group of direct channel selection keys 10b in the remote control transmitter 10 shown in FIG. 2. Key arrangements and key functions of the remote control transmitter 10 are of various types, and are not limited to those in the above-mentioned remote control transmitter 10.

In the present embodiment, the above-mentioned channel locking processing is not immediately performed when there occurs a state where data broadcasting is received, but the start of the processing in the foregoing item ① is suspended when it is judged that a channel-up/down operation is being performed or a channel is being changed (zapping is being performed) by preset channel selection. Such control is shown in a flow chart of FIG. 3. A channel selection operation is performed in response to operations such as a channel up/down operation (step S1), it is judged whether or not a data broadcasting program is tuned in to (step S2), and a data broadcasting engine (a browser 20) is started and a timer is started when the data broadcasting program is tuned in to (step S3). It is judged whether or not a predetermined time period has elapsed (whether or not a state where data broadcasting is received is continued for a predetermined time period) by measurement using the timer (step S4). When it is judged that the predetermined time period has elapsed, the channel locking processing in the foregoing item ① is performed.

② When it is judged that the remote control signal is a remote control signal corresponding to the "ten-key entry" key 10c in the remote control transmitter 10, processing for handling, out of the keys numbered "1" through "12", the keys numbered "1" through "10" as ten-keys "0" to "9" is performed, and a channel selection operation is performed by handling a three-digit number entered using the keys as a channel number. That is, channel locking is released by operating the "ten-key entry" key 10c in this case.

③ When a data broadcasting program is terminated on a channel which is being selected to broadcast another program (e.g., news), a channel locked state is automatically released. The simple contents of operations in such processing are shown in the steps S11, S12, and S13 in a flow chart of FIG. 4. It is judged whether or not the data broadcasting program is terminated depending on whether or not service identification in a received program is one other than that representing the data broadcasting program, for example.

④ While a channel is being locked, a character representation, pictographic characters (icons), and so forth indicating that a channel is being locked are displayed on a screen using an OSD function. In an example of a screen shown in FIG. 5, a character representation "a channel is being automatically locked" is displayed as the above-mentioned representation on the screen of the data broadcasting program.

As described above, out of signals from the remote control transmitter 10, the receiving of the signal related to channel selection is nullified (a channel is locked) in a state where the data broadcasting program is tuned in to. Even if the user erroneously operates the channel selecting key, no channel transition occurs.

As described in the foregoing, according to the present invention, it is possible to eliminate unpleasant situations where a channel is switched because a user erroneously pushes a button other than buttons associated with data broadcasting in enjoying a data broadcasting program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital broadcasting receiver so configured as to receive a digital broadcasting wave and acquire data for data broadcasting included therein to display a data broadcasting video on a screen as well as to make it possible to perform an indicating operation for the contents of the displayed data broadcasting video using a remote control transmitter, the digital broadcasting receiver comprising:

a judgment section for judging whether or not there occurs a state where a data broadcasting program is viewed with a browser; and a controller for nullifying, regardless of a specified channel, out of signals from said remote control transmitter, the receiving of a signal related to channel selection such that a channel change operation cannot be performed, in response to judging that there occurs the state where the data broadcasting program is viewed with the browser, and keeping the state where the data broadcasting program is viewed with the browser, wherein the judgment section is provided with a timer for judging whether or not a state where data broadcasting is received is continued for a predetermined time period, and wherein the start of the nullification is suspended when it is judged on the basis of an output of the timer that a zapping is being performed.

2. The digital broadcasting receiver according to claim 1, wherein said nullification processing is released when a predetermined key provided in the remote control transmitter is operated.

3. The digital broadcasting receiver according to claim 1, wherein said nullification processing is automatically released when the data broadcasting program is terminated.

4. The digital broadcasting receiver according to claim 2, wherein said nullification processing is automatically released when the data broadcasting program is terminated.

5. The digital broadcasting receiver according to claim 1, wherein during said nullification processing, a representation that the nullification processing is being performed is displayed on the screen.

6. The digital broadcasting receiver according to claim 2, wherein during said nullification processing, a representation that the nullification processing is being performed is displayed on the screen.

7. The digital broadcasting receiver according to claim 3, wherein during said nullification processing, a representation that the nullification processing is being performed is displayed on the screen.

8. The digital broadcasting receiver according to claim 4, wherein during said nullification processing, a representation that the nullification processing is being performed is displayed on the screen.

* * * * *

UNITED STATES PATENT AND TRADEMARK OFFICE
CERTIFICATE OF CORRECTION

PATENT NO.       : 7,580,082 B2                                                                Page 1 of 1
APPLICATION NO.  : 10/682721
DATED            : August 25, 2009
INVENTOR(S)      : Kiyoshi Matsumoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1397 days.

Signed and Sealed this

Fourteenth Day of September, 2010

David J. Kappos
*Director of the United States Patent and Trademark Office*